United States Patent [19]

Kits van Heyningen

[11] 4,001,763

[45] Jan. 4, 1977

[54] ELECTRONICALLY STABILIZED BEAM FORMER SYSTEM

[75] Inventor: Arent H. Kits van Heyningen, Newport, R.I.

[73] Assignee: Raytheon Company, Lexington, Mass.

[22] Filed: Feb. 3, 1975

[21] Appl. No.: 546,373

[52] U.S. Cl. .............................. 340/3 PS; 340/6 R; 343/100 SA

[51] Int. Cl.[2] ........................ G01S 9/66; G01S 7/54

[58] Field of Search .............. 343/100 SA; 340/6 R, 340/3 PS

[56] References Cited

UNITED STATES PATENTS

| | | | |
|---|---|---|---|
| 3,646,558 | 2/1972 | Campanella | 343/100 SA |
| 3,697,994 | 10/1972 | O'Daniel | 343/16 R |
| 3,859,622 | 1/1975 | Hutchison et al. | 340/6 R |

*Primary Examiner*—Richard A. Farley
*Attorney, Agent, or Firm*—David M. Warren; Joseph D. Pannone; Milton D. Bartlett

[57] ABSTRACT

A sonar system comprising a curved transducer array, typically in the form of a cylinder, in which the transducer elements are arranged in geometrically similar configurations on each of a plurality of planes having symmetry about a common axis. In the presence of an incident beam of radiant energy, the transducer elements are excited by signals having values of delay which vary from transducer to transducer in a regular pattern resulting from the symmetry of the array. This permits the utilization of a relatively small memory for the storing of delay values as a function of the bearing and tilt of the center line of a receiving beam relative to the axis of the array. The delay values are read out of the memory via switching and recycling circuitry to successively apply a sequence of delay values to delay elements coupled to the transducer elements to accomplish a steering of a transmitted or received beam in both elevation and azimuth. This permits the formation of a set of beams which are space stabilized independently of rolling and pitching movements of the array.

16 Claims, 15 Drawing Figures

ELECTRONICALLY STABILIZED BEAM FORMER SYSTEM

BACKGROUND OF THE INVENTION

This invention relates to a system for steering beams of radiant energy utilizing a curved array of radiating elements and, more particularly, to a sonar transducer array in which the transducer elements are arranged in a generally cylindrical format.

Sonic and electromagnetic radiation systems employing electronically steerable beams typically utilize a flat surface array of transducers or radiating elements for radiating a steerable beam. While curved arrays for sonar have been disclosed in the prior art, such as, for example, in U.S. Pat. No. 3,370,267 which issued to H. J. Barry on Feb. 20, 1968, and U.S. Pat. No. 3,497,868 which issued to C. H. Lanphier on Feb. 24, 1970, the use of a multiply-tiered array, such as a cylindrical array, has not found wide use in sonar tracking systems employing an electronically steerable beam because of the larger amount of computation required for establishing a set of delay values for delay units coupled to each of the transducer elements for forming a beam in a particular direction. This is a critical problem in the case of systems wherein the beam is to be steered rapidly in both elevation and azimuthal directions, tilt and bearing directions relative to an axis of the array, because the great amount of computer time required for the computation militates against a rapid scanning of the beam. Thus, the advantages of hemispherical coverage or at least a portion of a hemisphere including 360° of azimuthal coverage as can be provided by a cylindrical array, is not available for a rapidly scanning sonar system.

SUMMARY OF THE INVENTION

The aforementioned problems of the prior art are overcome and other advantages are provided by a system for transmitting and receiving radiant energy via a curved array of radiating elements which, in accordance with the teachings of the invention, utilizes a memory for storing values of delay for delay units coupled to each of the radiating elements. The transducer elements are arranged in rings about a common axis with the result that the number of words stored in the memory is greatly reduced from the total number of delay values associated with each of the bearing and tilt directions of a receiving beam of radiation, this reduction being attained by use of an equality of delay values resulting from the symmetrical positions of the transducer elements in the array.

In a preferred embodiment of the invention, the transducer elements are individually coupled to delay elements and are arranged in geometrically similar arrangements in each of a plurality of spaced apart transverse planes, each arrangement having symmetry about a common axis of the array. Switching and recycling circuitry are provided for reading out a sequence of delay values from a memory to command the delay elements to provide the values of delay to transducer signals corresponding to a predetermined value of tilt angle of a receiving beam relative to the axis of the array. The recycling circuitry provides for the application of subsequences of the sequence of read-out delay values to successive groups of the transducer elements corresponding to the bearing angle of the receiving beam. The aforementioned group of transducer elements consists of those elements in the radiating aperture of the array which are symmetrically placed about a projection of the center line of the receiving beam. The values of delay provided to the groups in successive equally spaced transverse planes of the array differ only by a constant value of delay related to the tilt angle, thereby further minimizing the number of delay values to be stored in the memory. The receiving beam is rotated in bearing about the axis of the array at a rate more than twice the bandwidth of received signals (the Nyquist sampling criterion) to provide continual coverage in azimuth. A computer coupled to an inertial navigator or ship's gryoscope computes the angle of tilt to provide a stabilized search pattern irrespective of pitching, yawing and rolling of a ship carrying the sonar beam. Analogous means for steering a transmitting beam is also disclosed. The electronic tilt control is particularly useful for relatively small ships wherein the roll and pitch rates are much faster than those of large ships and do not admit mechanical stabilization of the array, as by gimbal mounting, because of its attendant motor and gear noise.

It is noted that with a cylindrical array, the set of delay values applied to the signals of the transducer elements is dependent only on the angle of tilt between the array and the beam of radiant energy. The set of delay values is switched to the signals of the transducer elements positioned in the portion of the array designated by the bearing angle of the beam relative to the array. Thus, for example, in the generation of two distinct receiving beams having the same angle of tilt relative to the array but oriented relative to the array at differing bearing angles, the same set of delay values is used in the generation of each of the two beams.

BRIEF DESCRIPTION OF THE DRAWINGS

The aforementioned features and other aspects of the invention are explained in the following description taken in connection with the accompanying figures wherein.

DESCRIPTION OF THE PREFERRED EMBODIMENT

Figure 1:
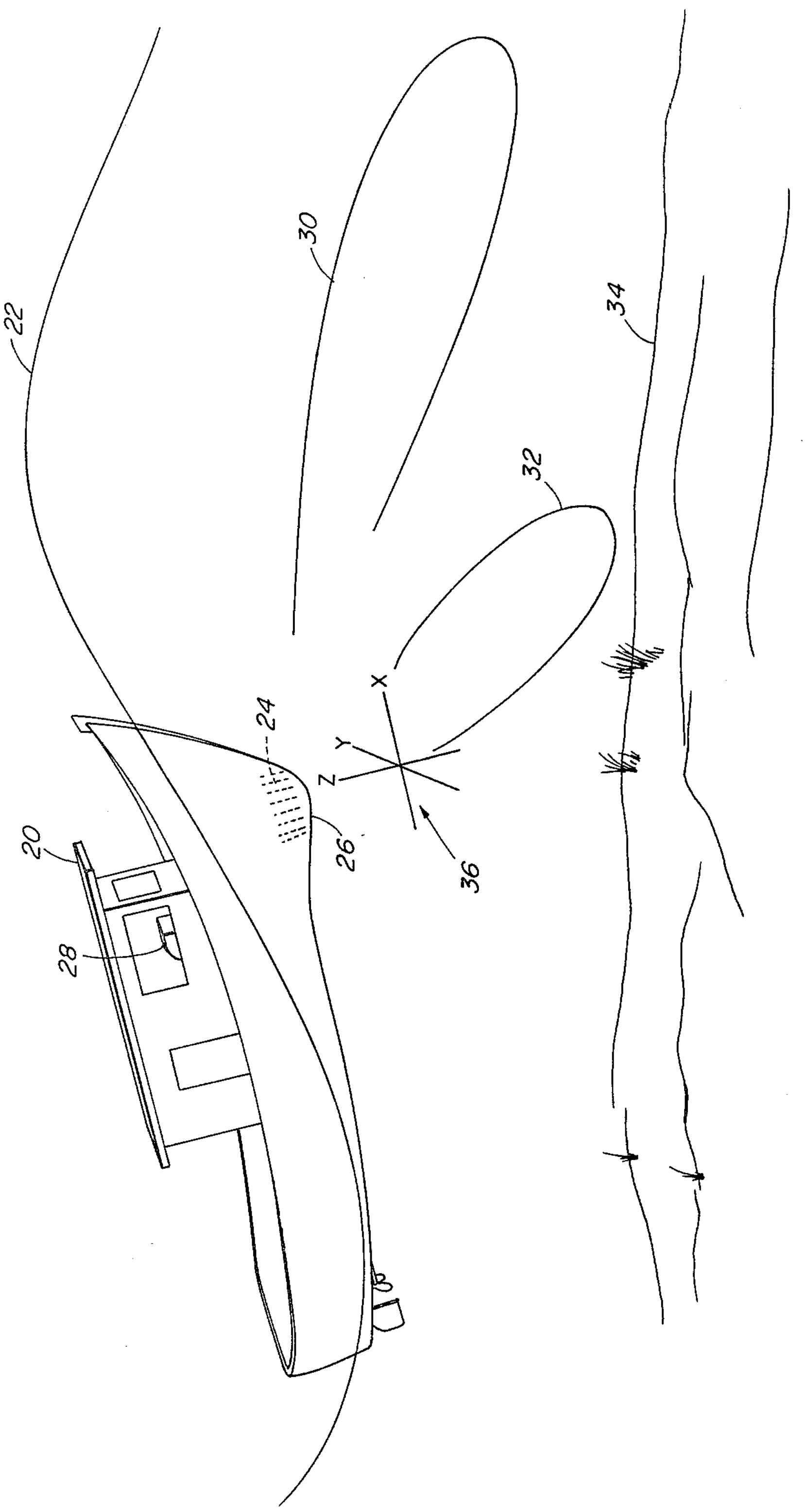
FIG. 1 is a stylized pictorial representation of a ship pitching and rolling, the figure also showing a coordinate reference frame aligned with a transducer array of the invention carried in the bow of the ship.

Referring now to FIG. 1, there is seen a ship 20 sailing into a wave 22 of the ocean which imparts a pitching and rolling motion to the ship 20. In accordance with the invention, the ship 20 carries a sonar transducer array 24 within a housing 26 at the bow of the ship 20 and a display 28 seen through a window in the cabin of the ship 20, the other components of the invention coupling the display 28 to the array 24 being seen in FIG. 6. The array 24 is shown receiving a beam of sonic energy, two such beams being identified by the numerals 30 and 32. The beams 30 and 32 are oriented at oblique angles with reference to the ocean bottom 34 and oriented at other angles with respect to the array 24. To facilitate description of the orientation of the beams 30 and 32 relative to the array 24, a coordinate reference frame 36 having X, Y and Z axes is positioned adjacent the array 24 with the Z axis of the reference frame 36 coinciding with a central axis of the array 24. The X axis is parallel to the longitudinal or roll axis of the ship 20 and the Y axis is parallel to the transverse or pitch axis of the ship 20. The array 24 is utilized for generating and receiving beams of sonic energy for the detection of objects submerged within the ocean. In accordance with the invention, these beams of sonic energy are oriented in a prescribed direction relative to the ocean bottom 34 substantially independently of the rolling and pitching of the ship 20.

Figure 2:
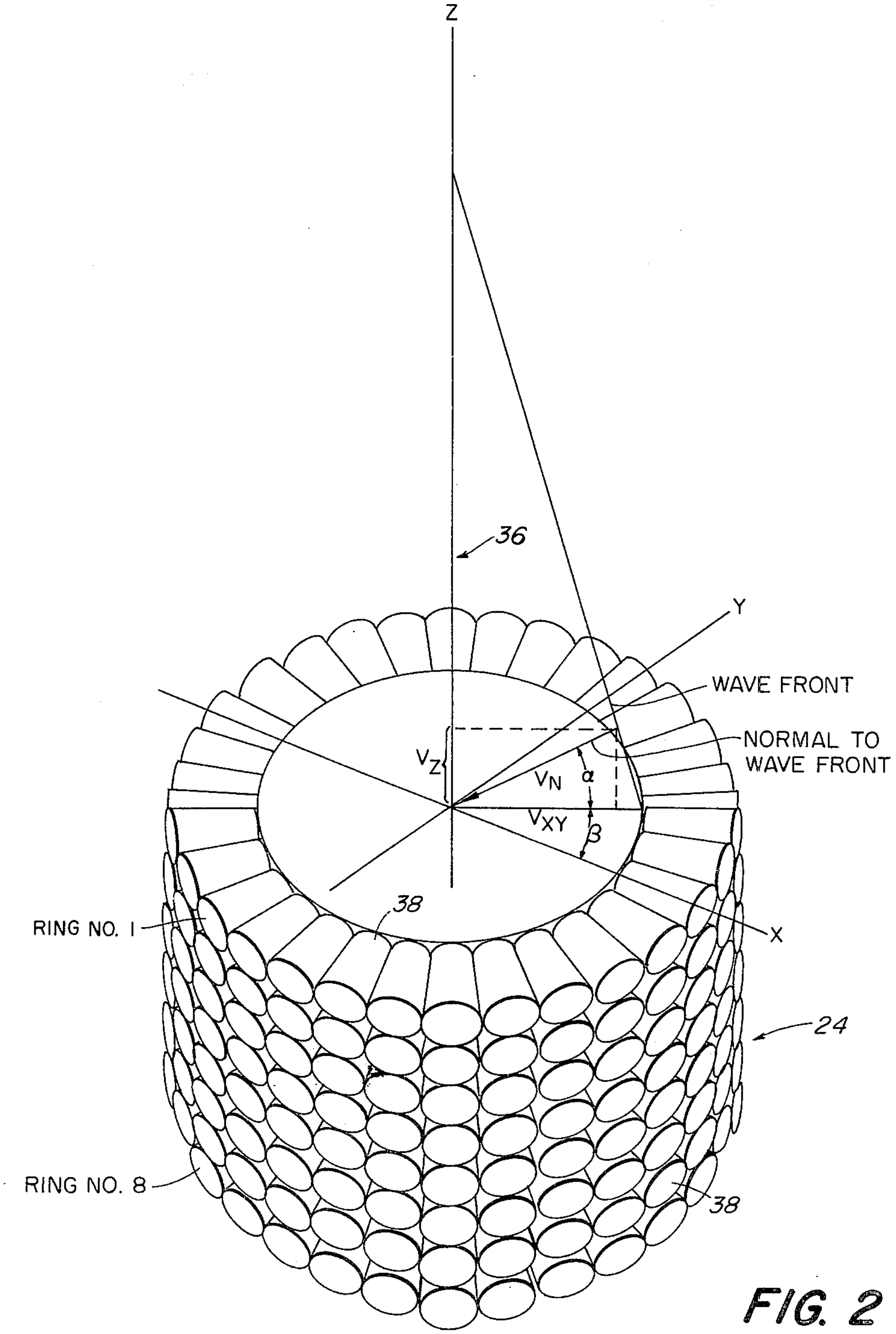
FIG. 2 is an isometric view of a cylindrical transducer array of the invention including a coordinate reference frame for showing the direction of an incident beam of radiant energy relative to the array.
Figure 4:
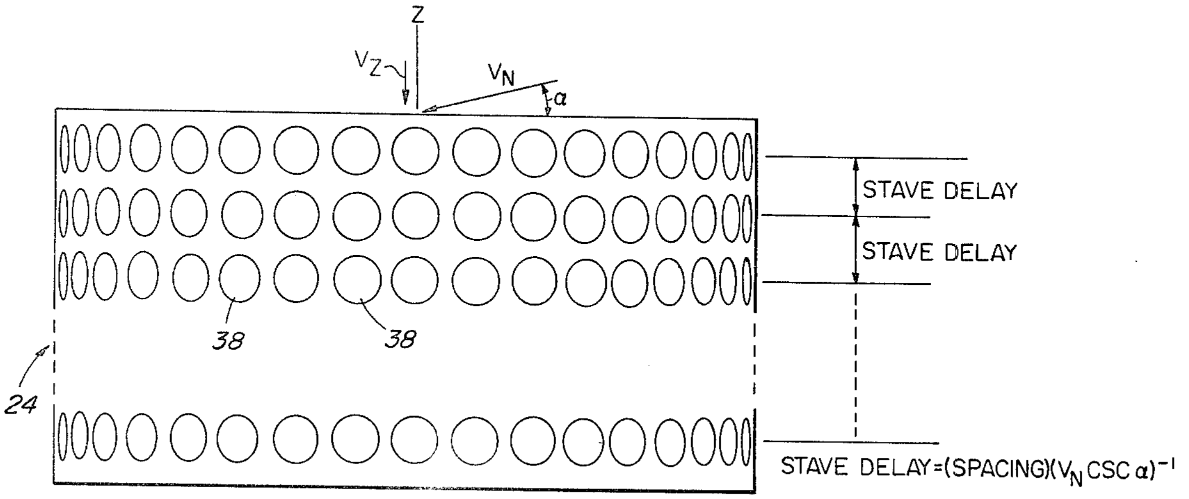
FIG. 4 is a side elevation view of the transducer array of FIG. 2 showing delays between successive groups of transducers positioned in transverse planes of the array.
Figure 3:
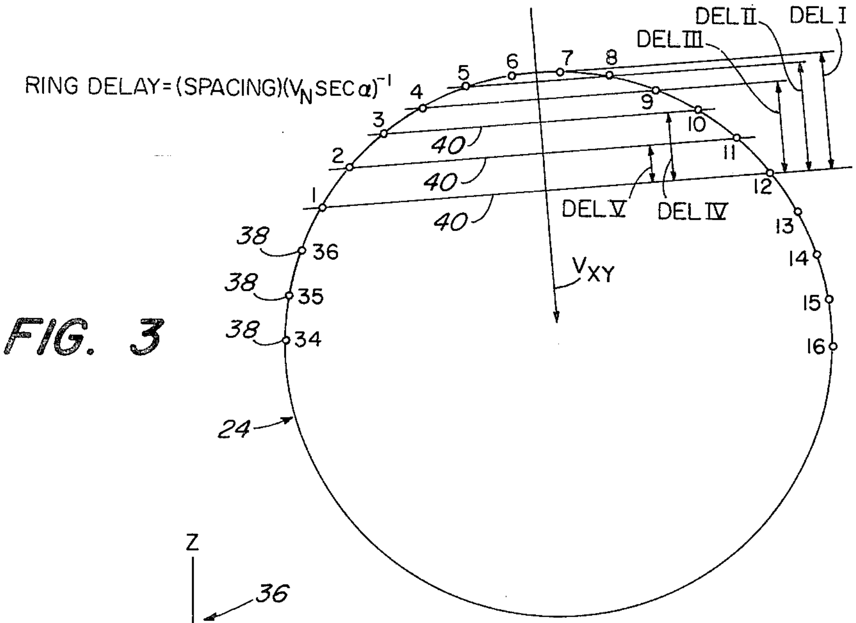
FIG. 3 is a plan view of the transducer array of FIG. 2 showing delays between successive groups of transducer elements.

Referring now to FIGS. 2, 3 and 4, there are shown, respectively, isometric, plan and elevation views of the array 24 of FIG. 1. The array 24 is composed, in a preferred embodiment of the invention, of eight rings of transducer elements 38, each of these rings having 36 transducer elements 38 and being spaced apart in planes transverse to the Z axis with the centers of the rings lying on the Z axis. In the plan view of FIG. 3, the individual transducer elements 38 are shown simply as little circles with numerals appended thereto for identifying individual ones of these transducer elements 38. With respect to the coordinate reference frame 36, the X and Y axes are seen to define a plane parallel to the planes containing the rings of transducer elements 38.

Also seen in FIG. 2 is a vector identified by the legend V*n* which is normal to an incident wave front of sonic energy and represents the speed and direction of movement of the wave front. The component of the vector V*n* along the Z axis is identified by the legend V*z* and the component of the vector V*n* lying within the XY plane is identified by the legend V*xy*. The vector V*xy* is seen to be oriented relative to the X axis by a bearing angle $\beta$, and the vector V*n* is seen to be oriented relative to the vector V*xy* by a tilt angle $\alpha$. The bearing $\beta$ and the tilt $\alpha$ will be referred to subsequently in describing the orientation of the vector V*n* relative to the array 24.

It is noted that an incident wave of sonic energy reaches various points of the array 24 at differing times as it advances past the array 24. Thus, the signals received by individual ones of the transducer elements 38 are delayed with respect to each other depending on the relative positions of the transducer elements 38 with respect to each other and with respect to the orientation of the vector Vn. As has been described in the aforementioned patent to Barry, as well as U.S. Pat. No. 3,356,989 which issued to S. W. Autrey on Dec. 5, 1967, the delays in the signals received by the various transducer elements 38 are compensated by delays implemented by electronic circuitry to permit combining of these signals. By appropriately selecting the delays of the electronic circuitry, a beam can be generated in a desired direction, such direction being defined by the tilt and bearing angles $\alpha$ and $\beta$. In particular, it is noted that, with reference to the ship 20 of FIG. 1, the orientation of any point within the ocean relative to the array 24 can be defined in terms of the tilt and bearing angles $\alpha$ and $\beta$.

The determination of the appropriate delays of the electronic circuitry utilized in combining the signals of the transducer elements 38 is a complex task, particularly in a situation wherein it is desired to generate a scanning beam from the array 24 which can be rapidly altered from a first desired orientation to a second desired orientation. In view of the pitching and rolling of the ship 20 of FIG. 1, it is apparent that the computation of the desired orientation of the scanning beam relative to the array 24 is best accomplished by means of a computer. While such computations can be made rapidly with respect to the pitch and rolling rates of the ship 20, computations of the signal delays between neighboring ones of the transducer elements 38 becomes a formidable task and one which requires excessive computer time which prevents the rapid scanning of a beam from the array 24. This invention makes use of the symmetry of the positions of the transducer elements 38 with respect to the reference frame 36 to develop sets of delays for various angles of tilt $\alpha$ and for selectively switching these sets of delays to transducer elements 38 in accordance with the bearing angle $\beta$ to direct a beam from the array 24 in a desired direction. The use of the aforementioned sets of delays negates the need for computation of the aforementioned interelement delays. As a result, rapid scanning of a beam from the array 24 can be readily accomplished.

In formulating the sets of delays to be utilized in combining the signals of the transducer elements 38, the axial and planar components corresponding to V*z* and V*xy* are considered separately. FIG. 3 shows the delays between neighboring transducer elements 38 lying within a transverse plane, these delays being referred to hereinafter as the ring delays which are proportional to the spacings between chords 40 and inversely proportional to the phase velocity of the wave front in the transverse plane in the direction of V*xy*. The phase velocity of the XY plane is proportional to secant $\alpha$. The chords 40 are drawn between pairs of transducer elements 38 symmetrically positioned about the vector V*xy*. A similar construction is shown in the aforementioned patent to Barry. In particular, it is noted that there is no relative delay between each of the pair of transducer elements 38 on any one chord 40. Thus, the wave front arrives at the transducer elements 38 numbered 3 and 10 at the same time with the result that signals of these two transducer elements 38 are to be summed together directly without inserting any delay therebetween. Similar comments apply to the pair of transducer elements 38 numbered 2 and 11, 1 and 12, as well as those numbered 4 and 9, 5 and 8, and 6 and 7. There is a delay identified by DELAY 1 between the transducer elements 38 numbered 7 and 12; similarly, there are delays between those elements numbered 8–12, 9–12, 10–12 and 11–12, each of the delays being identified respectively by the numerals II, III, IV and V.

In FIG. 4 it is seen that the delays associated with Vz are uniform from one transverse plane to the next irrespectively of the positions of the transducer elements 38 on the respective transverse planes. As seen in the elevation view of FIG. 4, the transducer elements 38 are seen to be arranged in vertical columns known as staves and, accordingly, the delay between signals received between neighboring transducer elements 38 within a stave is referred to hereinafter as a stave delay. It is seen that the stave delay is proportional to the spacing along the Z axis between neighboring transducer elements 38 and inversely proportional to the Z component of the phase velocity of the wave front in the direction of Vz. It is readily apparent that the magnitude of Vz is dependent on the angle of tilt $\alpha$, and that, therefore, the values of the stave delays are dependent on cosecant $\alpha$. It is also noted that by utilizing an equal spacing between the transverse planes of the array 24, each of the stave delays is equal so that only one value of stave delay need be stored for any one value of tilt $\alpha$. Similarly, with reference to FIGS. 2 and 3, it is apparent that the ring delays are also dependent on the angle of tilt $\alpha$. By utilizing a uniform spacing of the transducer elements 38 in circular rings of the array 24, the values of the ring delays are independent of the value of bearing $\beta$. Also, in the preferred embodiment of the invention, only 12 staves out of the total of 36 staves of transducer elements 38 are utilized in forming a receiving beam with the result that, as seen in FIG. 3, only five values of delay, plus a sixth delay command of zero value, need to be stored for any one value of tilt $\alpha$. The sum of the signals of the transducer elements 38 of any ring are temporally displaced from the sum signal of a contiguous ring by the stave delay; this permits combination of signals by ring and stave positions of the corresponding transducer elements 38.

Figure 5:
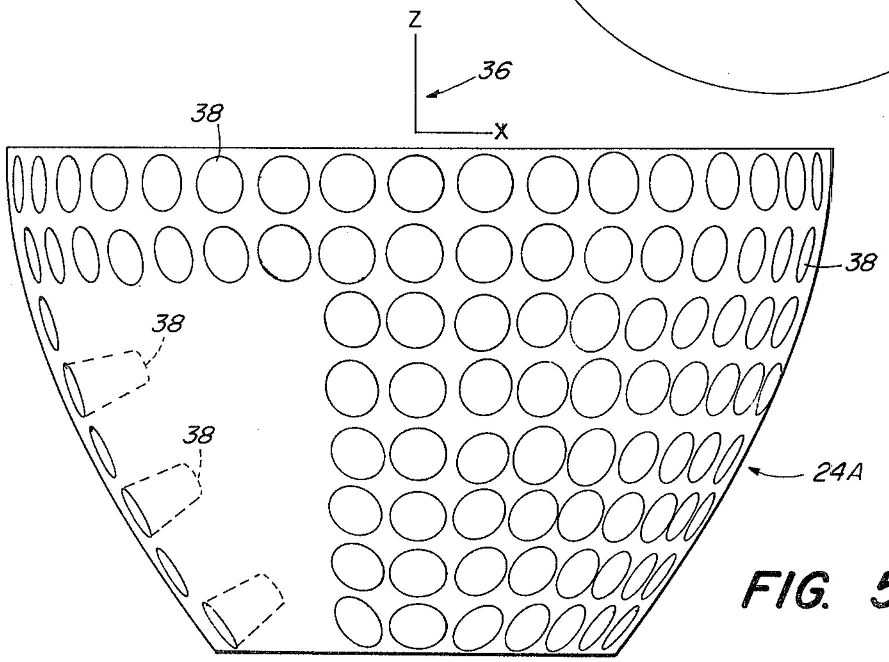
FIG. 5 shows an alternative embodiment of the transducer array carried by the ship of FIG. 1 in which the outer surface of the array has a truncated spherical shape to permit direction of beams of radiation at greater depression angles towards the ocean bottom of FIG. 1.

Referring now to FIG. 5, there is seen a transducer array 24A which is an alternative embodiment of the array 24 previously described. In the array 24A, the transducer elements 38 are arranged in concentric circles about the Z axis of the reference frame 36, but some of the circles are made smaller nearer to the bottom of the array 24A so as to create a curvature of the outer surface about a radius in a plane containing the Z axis. In addition, the transducer elements 38 of the lower rings are angled with respect to other transducer elements 38 in the upper rings so that their axes are normal to the surface of the array 24A. This more readily permits the generation of a beam of radiation in a downward direction from the ship 20 of FIG. 1 and is accomplished by use of the array 24 in view of the fact that a transducer element 38 has an individual directivity pattern which is most intense along its central axis but which falls off in directions transversely of its central axis.

Figure 6:
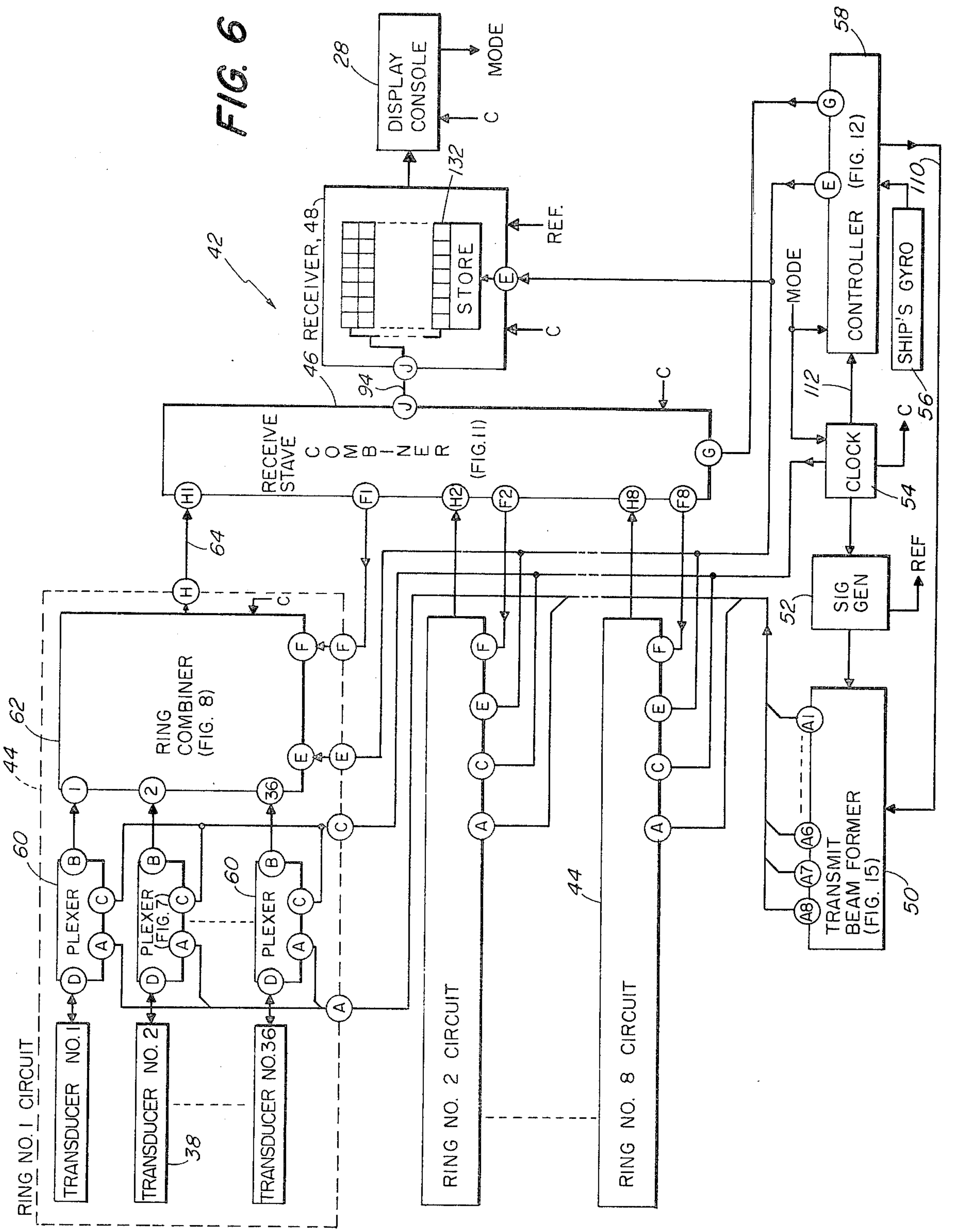
FIG. 6 is a block diagram of the curved array system of the invention showing the interconnection between the transducer array and a display seen on the ship of FIG. 1.

Referring now to FIG. 6, there is shown a block diagram of the curved array system 42 of the invention utilizing the array 24 of FIGS. 2, 3 and 4. The system 42 is seen to comprise eight ring circuits 44, a stave combiner 46, a receiver 48, a beam former 50 utilized for transmitting radiant energy from the transducer elements 38, a signal generator 52, a clock 54, a gyroscope 56 for providing a stable reference relative to the ship 20 of FIG. 1, and a controller 58 for ordering the values of delay for the various transducer elements 38 in the ring circuits 44. Each ring circuit 44 comprises 36 transducer elements 38, 36 diplexers 60, and one ring combiner 62. The diplexers 60, the ring combiner 62 and the stave combiner 46 will be described subsequently with reference to FIGS. 7, 8, 9, 10 and 11. The beam former 50 will be described subsequently with reference to FIG. 15 and the controller will be described subsequently with reference to FIGS. 12, 13 and 14.

In operation, briefly, the diplexers 60 couple signals received by individual ones of the transducers elements 38 in a specific one of the rings to the ring combiner 62, and also couple signals from the beam former 50 to their respective transducer elements 38 for the transmission of sonic energy therefrom. With respect to FIG. 3, the ring combiner 62 selects the specific set of twelve transducer elements 38 out of the 36 transducer elements 38 in one of the rings which are to be utilized in forming the receiving beam of sonic energy. The signals of the 12 selected transducer elements 38 are then delayed and summed together by the ring combiner 62, this combination being, for example, the sum of the signals of the transducer elements numbered 6 and 7 of FIG. 3 delayed by an amount of delay equal to DELAY 1 plus the sum of the signals obtained from the transducer elements numbered 5 and 8 delayed by an amount equal to DELAY II, proceeding similarly until all twelve signals from the transducer elements numbered 1 through 12 have been combined. The output of each ring combiner 62 at terminal H of the ring circuit 44 is thus the total contribution from this respective ring of transducer elements to the receiving beam. The ring circuits 44 are coupled to the stave combiner 46, the first ring circuit being coupled via line 64 to terminal H1 of the stave combiner 46, which sums these outputs together, the output of the stave combiner 46 being the total combination of $96 = (9 \times 12)$ transducer elements 38 to the receiving beam. The output of the stave combiner 46 is then processed by the receiver 48 and the result presented upon the display 28. The controller 58 provides the necessary control signals which provide a bearing indication to the ring combiner 62 for selecting transducer elements 38 positioned about the vector $V_{xy}$ of FIG. 2 and also provides the delay information to the ring combiner 62 via the stave combiner 46 which sums together the ring and stave delay commands, in a manner to be described, for instituting the proper delays for the combination of the signals. The signal generator 52 provides the signal for the beam former 50 which in turn delays this signal in varying amounts for the various staves of the array 54 of FIG. 2. The operation of the signal generator 52, the controller 58, the receiver 48 and the display 28 are synchronized by the clock 54.

Figure 7:
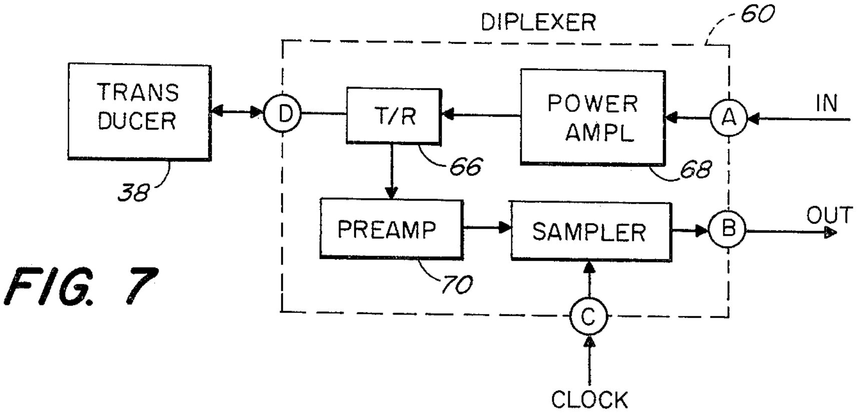
FIG. 7 is a block diagram of a diplexer of the system of FIG. 6.

Referring now to FIG. 7, there is seen a block diagram of the diplexer 60, previously seen in FIG. 6. The diplexer 60 comprises a transmit/receive circuit, hereinafter referred to as T/R 66, a power amplifier 68, a preamplifier 70 and a sampling circuit shown in the figure as sampler 72. The T/R 66 couples signals from the amplifier 68 through terminal D to the transducer 38 for transmission of sonic energy by the transducer 38, and also couples signals received by the transducer 38 to the preamplifier 70. The T/R 66 incorporates circuitry commonly used in sonar applications and may comprise transformer coupling of signals from the power amplifier 68 with diodes placed across the output port connected to the preamplifier 70 to protect it from large values of signal while permitting the relatively small amplitude of received signals to pass through the preamplifier 70. The power amplifier 68 accepts signals at terminal A and amplifies them to a suitable amplitude of power for transmission by the transducer 38. The preamplifier 70 amplifies received signals to an amplitude suitable for operation of the sampler 72. The sampler 72 is operated in response to clock pulses applied thereto via terminal C and converts analog samples of the received signal to multibit digital numbers. If desired, the sampler 72 may comprise a delta modulator, as is disclosed in the aforementioned patent to Autrey, in which case the receiver 48 of FIG. 6 would comprise well-known circuitry for demodulating the delta modulation to recover the samples of the received signal. Alternatively, the sampler 72 may be simply a onebit sampler, or limiter, providing a substantially square wave signal.

Figure 8:
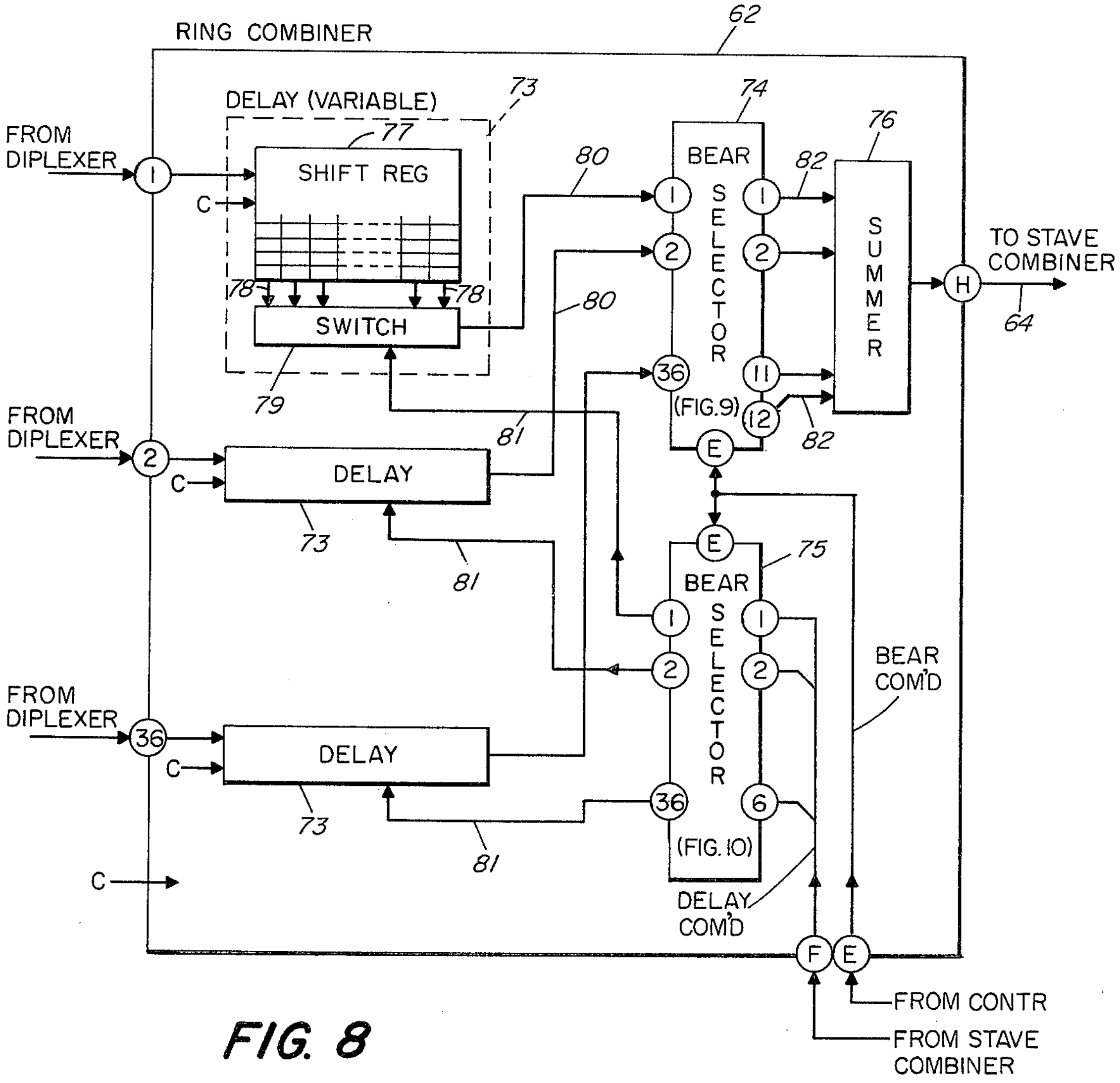
FIG. 8 is an interconnection diagram of a ring combiner of FIG. 6.

Referring now to FIG. 8, there is seen a block diagram of the ring combiner 62 which is seen to comprise a delay unit 73, a bearing selector 74, a second bearing selector 75 and a summer 76. The delay unit 73 comprises a shift register 77 having individual cells thereof coupled by line 78 to a switch 79. There is one delay unit 73 for each of the diplexers 60 of FIG. 6, the outputs of the respective delay units 73 being obtained along lines 80 from the respective switches 79. There are 36 lines 80 coupled to respective terminals 1-36 of the bearing selector 74. Control signals for the delay units 73 designating the amount of delay are coupled from the bearing selector 75 along lines 81 to the respective switches 79 in each of the delay units 73. Outputs of the bearing selector 74 are coupled along lines 82 from each of the twelve output terminals of the bearing selector 74 to the summer 76.

The delay units 73 provide sufficient delay to signals coupled to their respective transducer elements 38 of FIG. 6 to form a beam of radiant energy and to steer the beam in both the tilt and bearing directions. In FIG. 8 the shift register 77 is seen to comprise a plurality of parallel sections, each of which has a succession of cells for shifting one bit of the multibit samples of the sampler 72 of FIG. 7. In the event that the sampler 72 is simply a hard limiter providing one-bit samples, the shift register 77 need contain only one section. The switch 79, in response to a digital number appearing on line 81, couples a signal appearing on a specific one of the lines 78 to the output line 80. In view of the fact that successive ones of the lines 78 are coupled respectively to successive ones of the cells of the shift register 77, it being understood that each line 78 represents a plurality of lines coupled to respective sections of the shift register 77, the selection of one of the lines 78 by the switch 79 imparts a delayed multibit sample of the transducer signal to line 80, the amount of delay depending on which cell of the shift register 77 has been selected.

Figure 14:
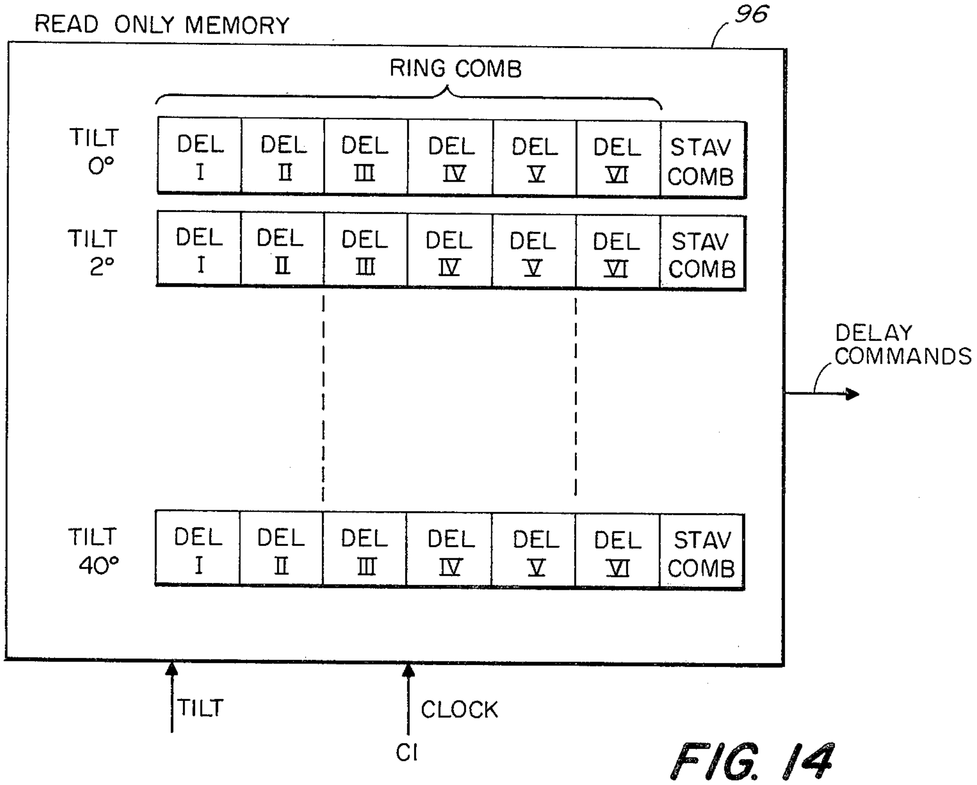
FIG. 14 is a memory of the controller of FIG. 12.

The two bearing selectors 74 and 75 are responsive to the bearing command signal at terminal E. As was seen in FIG. 3, the transducer elements 38 numbered 1–12 are symmetrically positioned about the vector V*xy* for forming a beam of radiant energy. The bearing selector 74 receives delayed signals from each of the 36 transducer elements 38 at its input terminals and selects the 12 contiguous transducer elements 38 utilized in forming the beam. Thus, the bearing selector 74, in response to the bearing command signal at terminal E, may select signals of the transducer elements 1–12, or of the transducer elements numbered 2–13 or any one of 36 groups of 12 transducer elements 38 corresponding to the 36 possible orientations of the vector V*xy*. In a similar manner, the bearing selector 75 couples delay command signals to the switches 79 in respective delay units 73 for coupling the five values of delay shown in FIG. 3 as DEL I–V for the twelve selected transducer elements 38 utilized in forming the beam of radiation. Thus, with reference to the radiating aperture formed of the transducer elements numbered 1–12, the delay units 73 coupled to the transducer elements 6 and 7 would receive command signals on the respective lines 81 for imparting a delay having the value DEL I, other ones of the delay units 73 imparting the values of delay labeled DEL II-V respectively to the pairs of transducer elements numbered 5–8, 4–9, 3–10 and 2–11. In addition, a sixth delay command, as will be seen in the memory of FIG. 14, is provided to order a value of zero delay to the transducer elements numbered 1 and 12.

As seen in FIGS. 6 and 8, the delay command applied via terminal F to the bearing selector 75 is obtained from the stave combiner 46 which, as noted hereinbefore, sums together the values of delay utilized in forming a beam in the horizontal direction as taught in FIG. 3 with the delays for tilting the beam as taught in FIG. 4. Thus, the delay commands appearing on the respective lines 81 for each of the 36 transducer elements 38 in each of the ring circuits 44 of FIG. 6 provide the requisite delay commands to form the beam and to tilt the beam, these delay commands being directed by the bearing selector 75 to the 12 staves utilized in forming the beam in accordance with the position of the vector V*xy* of FIG. 3. The summation of the delayed signals of the twelve selected transducer elements 38 by the ring combiner 62, as noted hereinbefore with respect to the description of FIG. 6, is accomplished by means of the summer 76 which functions in a manner similar to that of a summing circuit to be described hereinafter with reference to FIG. 11. The output of the summer 76 of the ring combiner 62 appears at terminal H wherein it is coupled via line 64 to the stave combiner 46 of FIG. 6.

Figure 9:
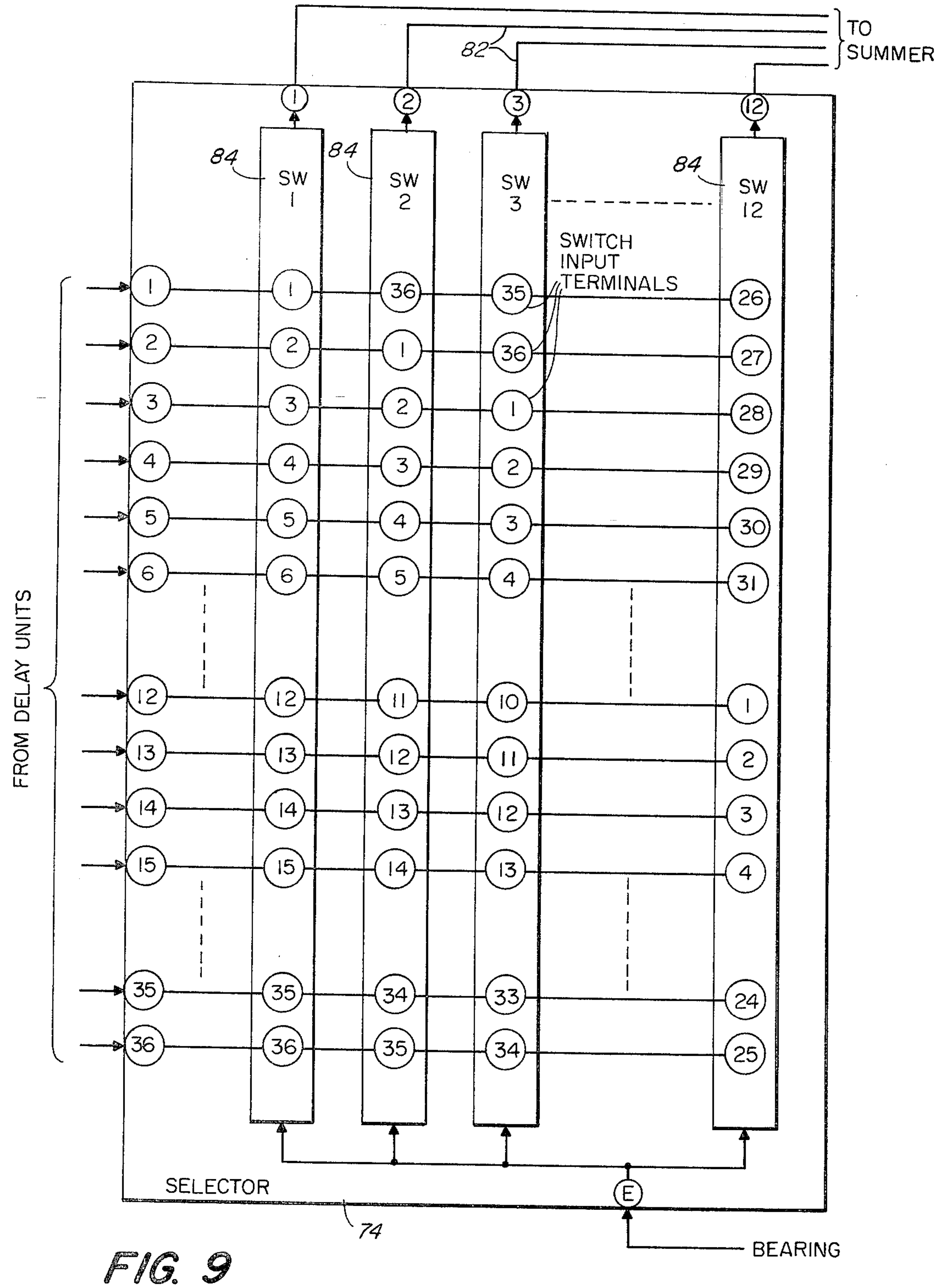
FIG. 9 is a block diagram of one selector of FIG. 8.

Referring now to FIG. 9, there is seen a block diagram of the bearing selector 74, previously seen in FIG. 8. The selector 74 comprises a set of electronic switches 84, each of which has 36 input terminals, corresponding to the 36 transducer elements 38 in a ring of the array 24 of FIG. 2, and one output terminal which is switchably connected to one of the input terminals. The switches 84 operate in response to a digital number provided at terminal E, this digital number designating which input terminal of a switch 84 is to be connected to its output terminal. There are twelve switches 84 with their output terminals being coupled via the selector output terminals numbered 1-12 and lines 82 to the summer 76 of FIG. 8. The 36 input terminals of the selector 74 are numbered 1–36 and are coupled respectively to the corresponding diplexers 60 of FIG. 6.

The switches 84 are coupled to the input terminals of the selector 74 by an arrangement which provides that each output terminal of the selector 74 is coupled to a different input terminal thereof. In addition, the 36 input terminals of each switch 84 are coupled to the 36 input terminals of the selector 74 in a manner which provides that, with reference to the plan view of a ring of the array 24 of FIG. 3, the signals appearing at the twelve output terminals of the selector 74 correspond respectively to a group of twelve contiguous transducer elements 38, these being the aforementioned set of twelve transducer elements in a ring utilized in forming a receiving beam of sonic energy.

As shown in FIG. 9, the interconnections of the input terminals of the switches 84 to the input terminals of the selector 74 are accomplished in the following manner. The individual switches 84 are numbered 1, 2, 3 . . . 12 for ease of reference. With reference to the input terminals of switch number 1 and the input terminals of the selector 74, switch terminal number 1 is coupled to selector terminal number 1, switch terminal number 2 is coupled to selector terminal number 2, and so on, with correspondingly numbered switch terminals being coupled to the selector terminals. With respect to the coupling of the input terminals of switch number 2 to the input terminals of the selector 74, switch terminal number 1 is connected to selector terminal number 2, switch terminal 2 is connected to selector terminal 3, switch terminal 3 is connected to selector terminal 4, and so on, with switch terminal 35 being connected to selector terminal 36 and switch terminal 36 being connected to selector terminal 1. With respect to the coupling of switch number 3, input terminals to the selector input terminals, switch terminal 1 is connected to selector terminal 3, switch terminal 2 is connected to selector terminal 4, switch terminal 3 is connected to selector terminal 5, switch terminal 4 is connected to selector terminal 6, and so on, with switch terminal 34 being connected to selector terminal 36 and switch terminal 35 being connected to selector terminal 1. Thus, it is seen that the interconnections of the several switches 74 are accomplished by a permutation of the switch terminals with successively numbered switches having their number 1 terminals coupled to successively higher numbered input terminals of the selector 74. For convenience in drawing the figure, only the switches 1, 2, 3 and 12 are shown; however, it is understood that the number 1 terminal of switch 4 is coupled to selector input terminal 4, the number 1 terminal of switch 5 is coupled to selector input terminal 5, and the number 1 input terminal of switch 6 is connected to the selector input terminal 6.

Referring to FIGS. 3 and 8, it is seen that each set of switch positions of the selector 74 corresponds to one of the 36 orientations of the vector V*xy*. The vector V*xy* of a receiving beam may bisect the chord joining transducer elements number 6 and number 7, or may bisect the chord joining the transducer elements number 7 and number 8, or any other pair of the group of symmetrically positioned 12 transducer elements 38 to give a total of 36 possible orientations of the vector V*xy*. These represent 36 possible bearing angles of a receiving beam and, accordingly, the digital number coupled to terminal E of the selector 74 represents the bearing of the receiving beam. The bearing being applied to the selector 74 by the controller 58 of FIG. 6.

Figure 10:
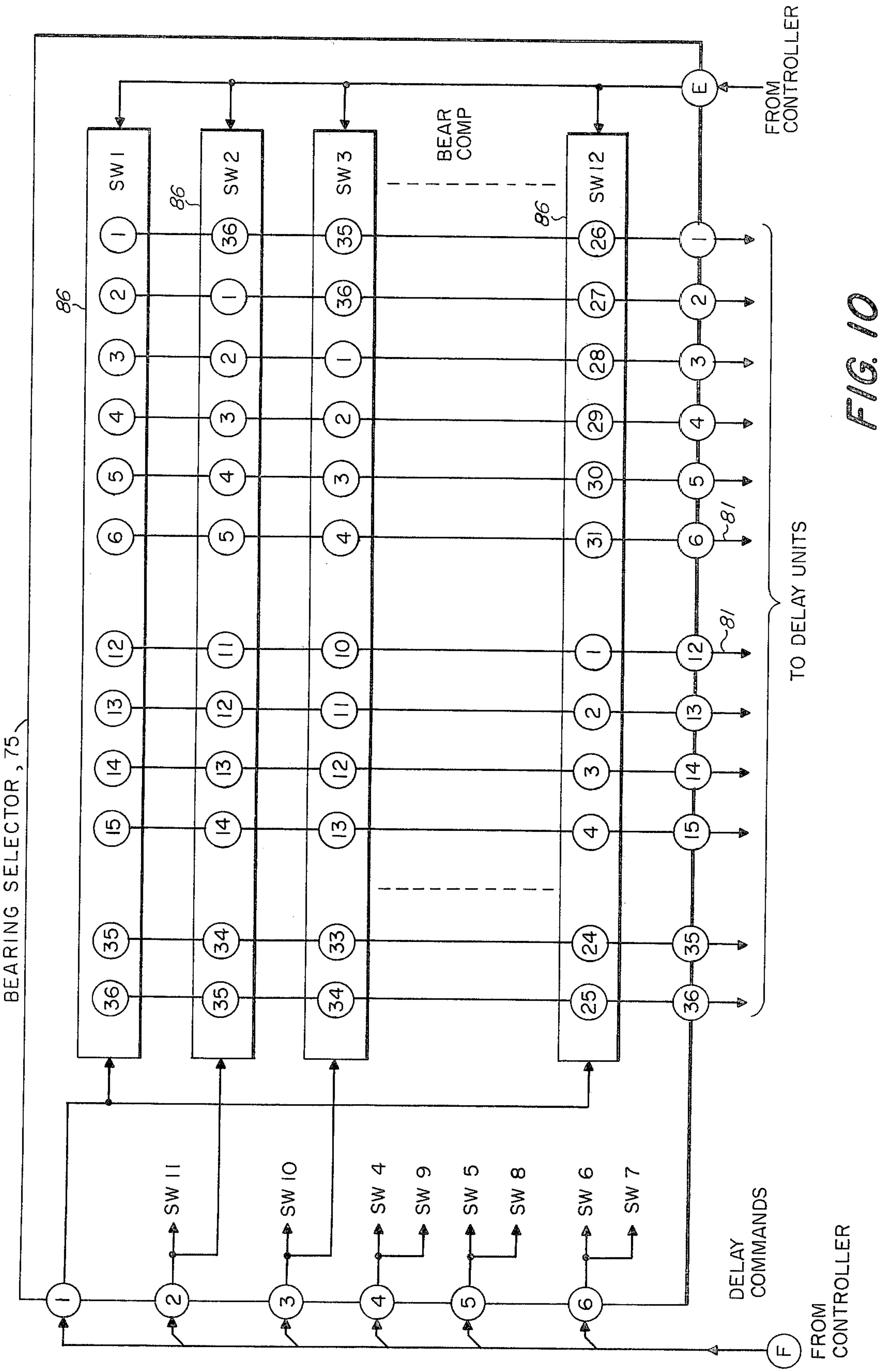
FIG. 10 is a block diagram of a second selector of FIG. 8.

Referring now to FIG. 10, there is seen a diagram of the bearing selector 75 of FIG. 8 which comprises a plurality of switches 86 which function in a manner analogous to the switches 84 of FIG. 9. Each switch accepts an input delay command from terminal F and, in response to the bearing command signal at terminal E, couples the signal from terminal F to one of its 36 output terminals. Each output terminal of each of the switches 86 is coupled to a specific one of the 36 output terminals of the selector 75 which are in turn coupled via lines 81 of FIG. 8 to delay units 73. The arrangement of the coupling of the 36 output terminals of the twelve switches 86 of the selector 75 follows the same arrangement previously taught in FIG. 9 with reference to the 36 input terminals of the switches 84 such that there is a permutating of the 36 output terminals of one switch 86 relative to the next switch 86 so that, in response to each bearing command signal, the corresponding set of delay units 73 for a set of 12 contiguous transducer elements 38 of FIG. 3 are operated.

With reference to FIGS. 3 and 10, it is noted that the pair of transducer elements 38 numbered 6 and 7 utilize the same value of dalay and, accordingly, the delay command signals of terminal F of the ring combiner 62 of FIG. 8 are coupled via terminal 6 of the selector 75 to the switches numbered 6 and 7. Similarly, as seen in FIG. 3, the transducer elements numbered 1 and 12 receive the same delay and, accordingly, the delay command coupled from terminal F via terminal 1 of the selector 75 is coupled to both switches 1 and 2. Similar comments apply to the other switch pairs 2 and 11, 3 and 10, 4 and 9, and 5 and 8.

Figure 11:
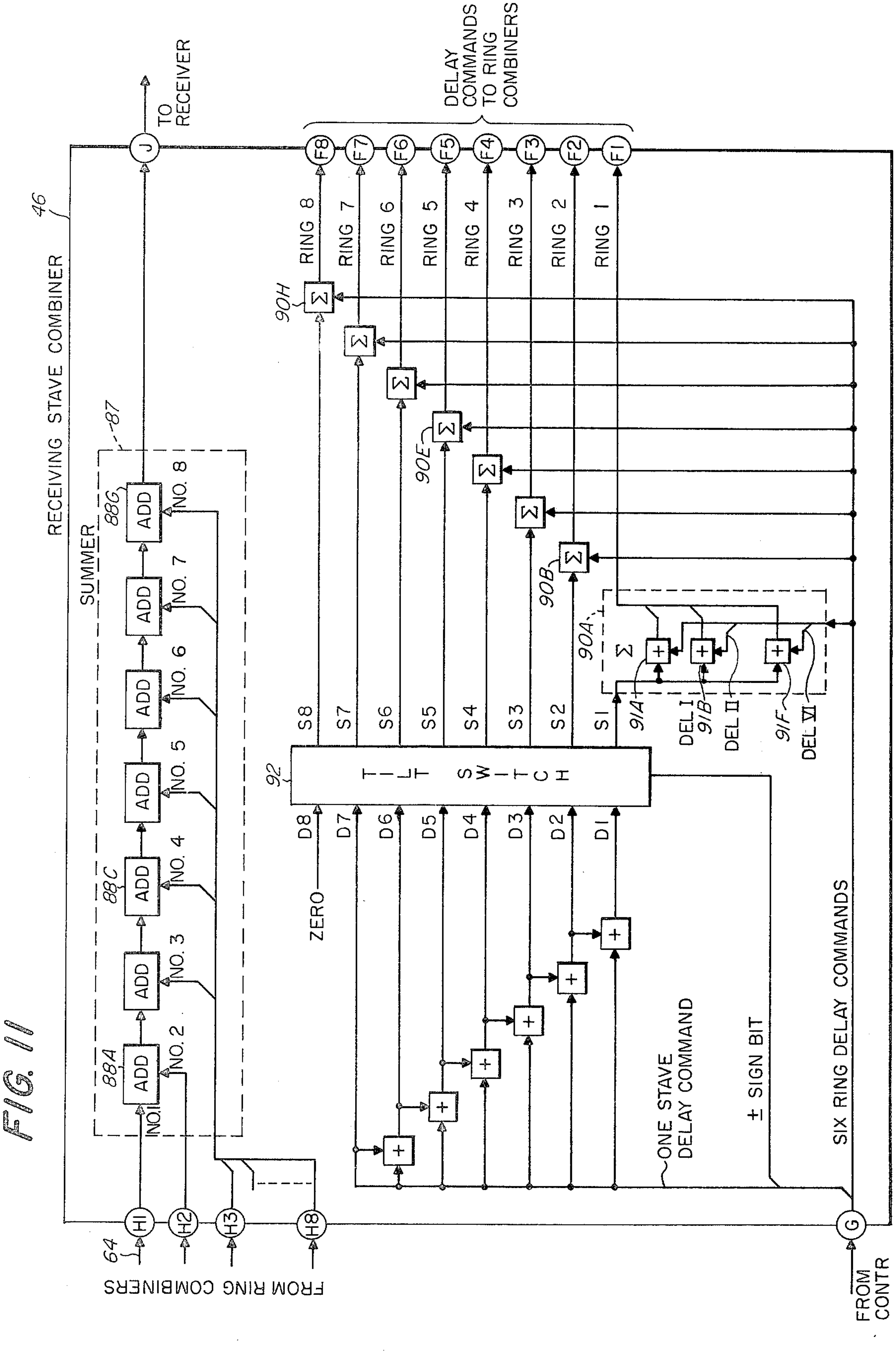
FIG. 11 is a block diagram of a stave combiner of FIG. 6.

Referring now to FIG. 11, there is seen a diagram of the receiving stave combiner 46, previously seen in FIG. 6, which comprises a summer 87 having a set of seven adders 88A–G, a set of six adders 89A–F, a set of eight summers 90A–H, each of which includes a set of six adders 91A–F, and a switch 92. The summer 87 is coupled to eight input terminals H1–H8 of the stave combiner 46 of FIG. 6, each of the terminals H1–H8 coupling signals from the correspondingly numbered ring circuits 44 to the summer 87 which sums together the signals to form an output signal at terminal J, this output signal being the combination of the signals of all eight transducer elements in each of the 12 staves of the receiving aperture of the array 24 of FIG. 2. The adder 88A is a multibit adder with sufficient capacity to add the signals from two samplers 72 of FIG. 7, the adder 88B having sufficient capacity to add this sum with the multibit number of the sampler 72 of the third ring circuit 44 of FIG. 6, and so on, with the adder 88G having sufficient multibit capacity for providing the output of all the eight ring circuits 44 of FIG. 6.

Terminal G of the stave combiner 46 provides all the delay command signals, these being the stave delay command, a sign bit indicating whether the beam of radiation is oriented at a positive or negative angle relative to the array 24 of FIG. 2, and the six ring delay commands corresponding to the six pairs of radiating elements in each ring of the radiating aperture. As has been noted hereinbefore, the stave combiner 46 combines the stave delay command with the ring delay commands so that one delay unit 73, with its corresponding command signal, can be utilized by the ring combiner 62 of FIG. 8 for each of the 36 transducer elements in each ring of the array 24. As was noted in FIG. 4, the stave delays are equal between elements of adjacent rings for an equal spacing between the adjacent rings. Accordingly, the stave delay between ring number 1 and ring number 3 is twice the stave delay between ring number 1 and ring number 2. Similarly, the stave delay between rings 1 and 4 is three times the stave delay between rings 1 and 2, and so on, this relationship continuing such that the delay between elements of the first ring and elements of the eighth ring is seven times the stave delay between the elements of the first and second rings. The foregoing relationship between the amounts of delay between the successive rings of the array 24 is accomplished by the adders 89A–F in which adder 89A is seen to add the value of the stave delay to itself, the output of the adder 89A appearing on line D6 for transducer elements of the sixth ring of the array 24. Line D8 provides a delay command of zero since, for the case of radiant energy arriving along a beam oriented with a positive angle of tilt relative to the array 24, a wave front arrives at the first ring first and at the eighth ring last so that a maximum amount of delay is to be applied to the first ring with zero delay being applied to the eighth ring for combining the signals of the eight rings in phase. Line D7 provides a delay command of value equal to the stave delay, while line D6 provides the aforementioned delay command of twice the stave delay. Similarly, the line D5 provides three times the stave delay, this value being obtained by the adder 89B which adds the value of the stave delay to the output of the adder 89A. Similar comments apply to the remaining lines D1–4 with the result that a maximum delay command of value equal to seven times the stave delay appears on the line D1.

The signals of lines D1–D8 are coupled via the tilt switch 92 to the lines S1–S8 via which they are applied to the summers 90A–H for combining with the ring delay commands to provide the composite delay command for each of the eight rings of the array 24, these composite commands appearing on the lines labeled RING 1-RING 8 and the terminals F1–F8. The summers 90A–H are all of the same form with the components of the summer 90A being shown in the figure. Thus, it is seen that each summer 90A–H comprises six adders 91A–F for adding to each of the six ring delay commands DEL I–VI the value of the delay command from the switch 92. Thus, at each of the terminals F1–F8 there appears a total of six delay commands, each of which is the sum of a ring delay command plus the corresponding multiple of stave delay commands.

The switch 92 is activated by the sign bit so that for a positive value of the sign bit, the lines D1–D8 are coupled to the correspondingly numbered lines S1–S8. In response to negative values of the sign bit, the switch couples line S1 to line D8, line S2 to line D7, and so on, with line S8 being coupled to line D1. Thus, in response to the negative sign bit, the switch 92 reverses the values of the multiples of the stave delay command so that the value of zero delay is applied to the transducer elements 38 of the first ring of FIG. 2 while the maximum value of delay is applied to the transducer elements 38 of the eighth ring of the array 24 of FIG. 2. The foregoing coupling of the stave delays provides for the forming of a receiving beam oriented with a negative angle of tilt relative to the array 24.

In the event that the vector V*n* of FIG. 4 is horizontal, the incident wave front reaches all the elements of a stave at the same instant of time and, accordingly, in this situation, the stave delay command signal at terminal G commands a zero value of stave delay. As the orientation of the vector V*n* approaches the vertical, the magnitudes of the delays between the rings increased with a maximum delay being obtained when the vector V*n* coincides with the Z axis. As a practical matter in the design of the system 42 of FIG. 6, it is assumed that the tilt angle $\alpha$ does not exceed approximately 40°, this being sufficient to accommodate the relevant sea states of FIG. 1.

Figure 12:
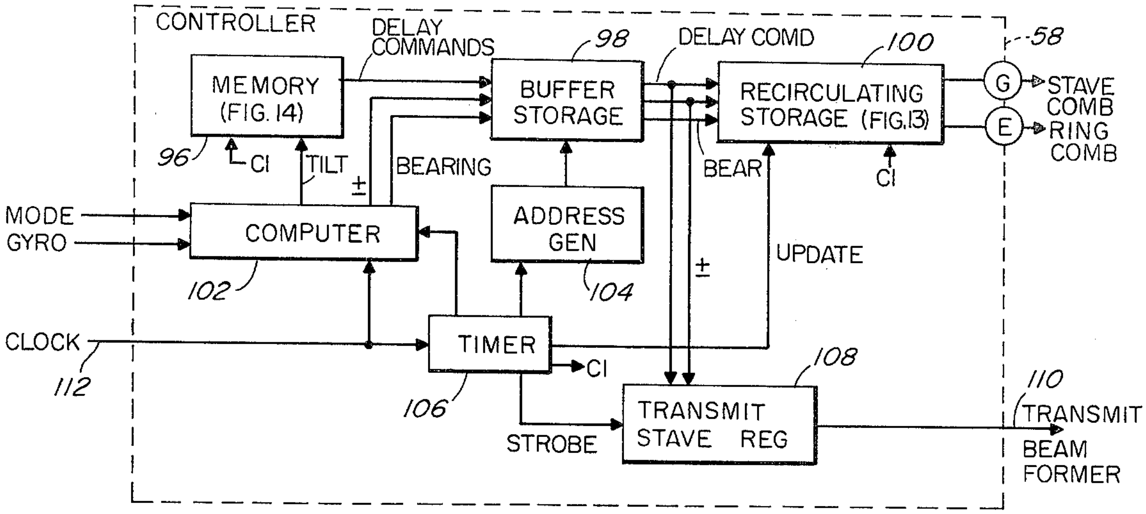
FIG. 12 is a block diagram of a controller of FIG. 6.

Referring now to FIG. 12, there is seen a block diagram of the controller 58, previously seen in FIG. 6, which comprises a memory 96, buffer storage 98, a recirculating storage unit 100, a computer 102, an address generator 104, a timer 106 and a register 108. As seen in FIG. 6, the controller 58 is coupled via terminal G to the stave combiner 46, via terminal E to the ring combiner 62 and via line 110 to the beam former 50. The computer 102 and the timer 106 are responsive to clock signals on line 112. The computer 102 is responsive to a mode signal obtained from the display console 28 of FIG. 6 and a signal from the ship's gyro 56.

As has been noted hereinbefore, a feature of the invention is the generation of delay control commands for forming beams of radiant energy by means of a set of prestored command signals having a number of stored commands which is relatively small compared to the number of possible beam orientations and the number of individual transducer elements involved in forming and directing the beams in these many orientations. The memory 96 contains all the command signals which are utilized in ordering the set of delay values, in FIG. 6, for the ring combiner 62, the stave combiner 46 and the transmit beam former 50. The computer 102 operates in response to requests from the display console 28 coupled via the mode line and in response to ship orientation data provided by the ship's gyro 56 to compute the desired orientation of the receiving beam in terms of the angles of tilt and bearing of FIG. 2. The computer 102 transmits a tilt command to the memory 96 which, in response thereto, transmits to the buffer storage 98 the appropriate set of delay commands. The computer 102 transmits a bearing command to the buffer storage 98 for ordering the ring combiner 62 to direct the beam in the desired direction. The operation of the controller 58 may be further understood by first describing the recirculating storage unit 100 with the aid of FIG. 13 and the memory 96 with the aid of FIG. 14.

Figure 13:
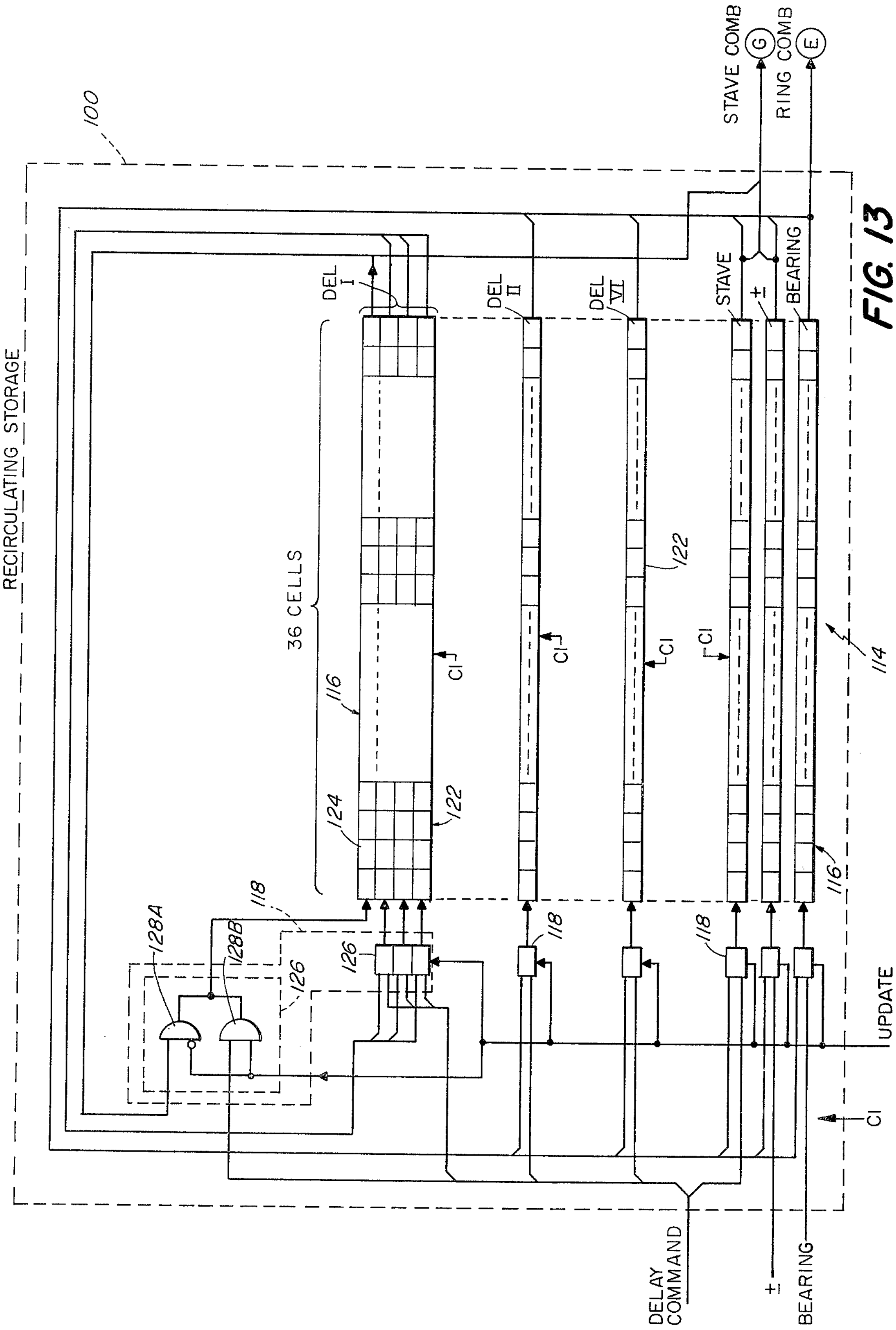
FIG. 13 is a diagram of a recirculating storage unit of the controller of FIG. 12.

Referring now to FIG. 13, there is seen a block diagram of the recirculating storage unit 100 which comprises a shift register 114 composed of a plurality of sections 116, and steering units 118. Each steering unit 118 is coupled to one of the sections 116. Each shift register section 116 comprises cells 122 through which multibit digital numbers are shifted towards the right in response to clock pulses, C1, obtained from the timer 106 of FIG. 12. The individual cells 122 are divided into compartments 124, each of which contains one bit of a digital number being shifted down a shift register section 116. Each steering unit 118 is comprised of sections 126, one section 126 for each bit of the digital number entering a shift register section 116, and each of the steering unit sections 126 comprising two AND gates 128A and 128B.

The recirculating storage unit 100 accepts as its input signals the delay commands of the memory 96 via the buffer storage 98, the ± sign bit and the bearing signal of the computer 102 via the buffer storage 98, the C1 clock signal and the update signal from the timer 106. The output signals of the recirculating storage unit 100 are the aforementioned signals at the terminals G and E of FIG. 12. The delay command signals corresponding to the delays DEL I-V of FIG. 3 plus DEL VI representing a command of zero delay are coupled to individual ones of the shift register sections 116, and the stave delay command corresponding to the stave delay of FIG. 4 is coupled to another shift register section 116 as shown in FIG. 13. The ± sign bit and the bearing signal are coupled to individual shift register sections 116. The coupling of the aforementioned input signals to the shift register sections 116 is accomplished via the corresponding steering units 118 which, in response to the update signal, permit recycling of the stored digital numbers from the back end of the shift register 114 to the front end thereof or replacing the stored digital numbers with new values of the delay commands, the ± sign bit and the bearing signal.

With respect to the steering unit sections 126, each of the AND gates 128A-B is connected to the update signal. The terminal of the AND gate 128A connected to the update signal is complemented so that when the update signal is low, corresponding to a logic state of zero, the AND gate 128A couples signals from an output terminal of the shift register 114 to the corresponding input terminal. When the update signal is high, corresponding to a logic state of 1, the signal of that output terminal is discarded and the corresponding input signal is entered into the shift register 114.

In operation, therefore, the recirculating storage unit 100 accepts new input data whenever the update signal is high and continuously recirculates this data when the update signal is low, this recirculation of the data providing for its sequential values of the delay command, the sign bit and the bearing signal to appear at the terminals G and E.

Referring now to FIG. 14, there is seen a diagram of the memory 96 which is conveniently built in the form of a read-only memory wherein the data is permanently stored. The memory is divided up into sections, each section having six commands, DEL I–VI, for the ring combiner 64 of FIG. 9 and one command for the stave combiner 46 of FIG. 11. One such section is provided for a tilt angle of 0°, a second section for a tilt angle of 2°, individual sections being provided for tilt angles of 4°, 6° and so on, through 40°. In response to a tilt signal from the computer 102, the memory 96 provides the corresponding set of delay commands to the buffer storage 98, this data being clocked out in response to clock pulses C1 from the time 106. While FIG. 14 shows the memory 96 provides the corresponding tions for each 2° of tilt angle, if desired, such sections may be provided only for every 4° of tilt angle, the number of sections being a matter of design choice depending on the beamwidth in elevation of the receiving beam of the array 24 of FIG. 2.

Returning now to FIG. 12, it is seen that the controller 58 provides sequential values of the signals at terminals G and E at a rate depending on the rate of clock pulses C1 which in turn is synchronized to the clock signal on line 112. Thus, at periodic intervals, the bearing selectors 74 and 75 of the ring combiners 62 of FIG. 6 are operated to redirect the receiving beam while, simultaneously, the delay units 73 of the ring combiners 62 and the stave combiner 46 of FIG. 6 are updated, if necessary. For example, in the event that the ship 20 of FIG. 1 is perfectly level, and it is desired to provide an azimuthally scanning receiving beam, then the stave delay command at the stave combiner 46 steadily imparts zero delay command to the signals of each of the eight ring circuits 44 in response to successive values of data of the recirculating storage unit 100 and, similarly, the values of delay provided by the ring combiners 62 remain invariant with the successive values of the output of the recirculating storage unit 100.

As a second example, consider the situation where the ship 20 of FIG. 1 has a 10° roll to starboard. The computer 102 of FIG. 12 is made aware of the 10° roll by virtue of its connection to the ship's gyro 56 of FIG. 6. The computer 102 then computes the values of tilt angle $\alpha$ for each of the 36 bearing angles $\beta$. The computer successively addresses the memory 96 with the appropriate value of tilt for each of the 36 bearing angles and then the corresponding values of bearing angle, the ± sign bit and the set of delay commands corresponding to the designated tilt angle are fed into the buffer storage 98 at locations therein as designated by the address generator 104, the operation of the address generator 104 being synchronized to the computer 102 by the timer 106. The data stored in the buffer storage 98 is then transferred to the recirculating storage 100 in response to the update signal of the time 106. It is readily seen, that in this example of the 10° roll, that in order to generate an azimuthally directed scanning beam, the stave combiner 46 will inject delay values corresponding to an elevation of 10° when the receiving beam is directed to starboard, an elevation angle of 0° when the receiving beam is directed both forwards and aft of the ship 20, and a depression angle of 10° when the receiving beam is directed to port. An intermediary values of bearing between the aforementioned four directions, the computer 102 provides for elevation angles from +10 to 0° to the nearest 2° increment with a positive value of the sign bit for beams directed to the right side of the ship's center line, and elevation values from 0° to −10° in increments of 2° with a negative value of the sign bit for beams directed to the left side of the ship's center line.

A feature of the invention is the fact that the changing of values at the output of the recirculating storage unit 100 can occur at a rate which is very much higher than the rate at which the computer 102 performs its calculations for updating data in the buffer storage 98. For example, if the receiver 48 of FIG. 6 is to provide output signals in a base bandwidth of 3 kHz (kilohertz), the Nyquist sampling rate is 6 kHz and the sampler 72 of the diplexer 60 of FIGS. 6 and 7 may sample the input signal at a rate above the Nyquist rate, for example, 10 kHz. Since new data is obtained with each of the 36 positions of the scanning receiving beam, the sampling is to be done at the 10 kHz rate for each of the 36 positions. It is apparent that an azimuthally scanning receiving beam need rotate about the axis of the array 24 of FIG. 2 at a rate of 10 kHz and that the individual shifts in position for each of the 36 bearing angles occurs at a rate of 36 × 10 kHz; this is a rate of 360 kHz at which successive values of data appear at the output of the recirculating storage unit 100. In other words, there is approximately a 3 microsecond interval between successive values of the data at the output of the recirculating storage unit 100. This 3 microsecond interval is too short a time for a computer to calculate new values for all the delays imparted by the ring combiners 62 of FIG. 6. However, in accordance with the invention, the computer 102 need not compute at such a fast rate, it need compute only at a rate commensurate with the rates of roll and pitch of the ship 20 of FIG. 1, these rates being very much slower than the rate of updating of values at the output of the recirculating storage unit 100. As the computer 102 performs an updating of the desired values of delay for the ring combiner 62, these values are inserted into the buffer storage 98 and then transferred to the recirculating storage unit 100 so that the orientation of the scanning path of the receiving beam is gradually altered as this beam is rapidly rotated about the axis of the array 24 of FIG. 2.

Figure 15:
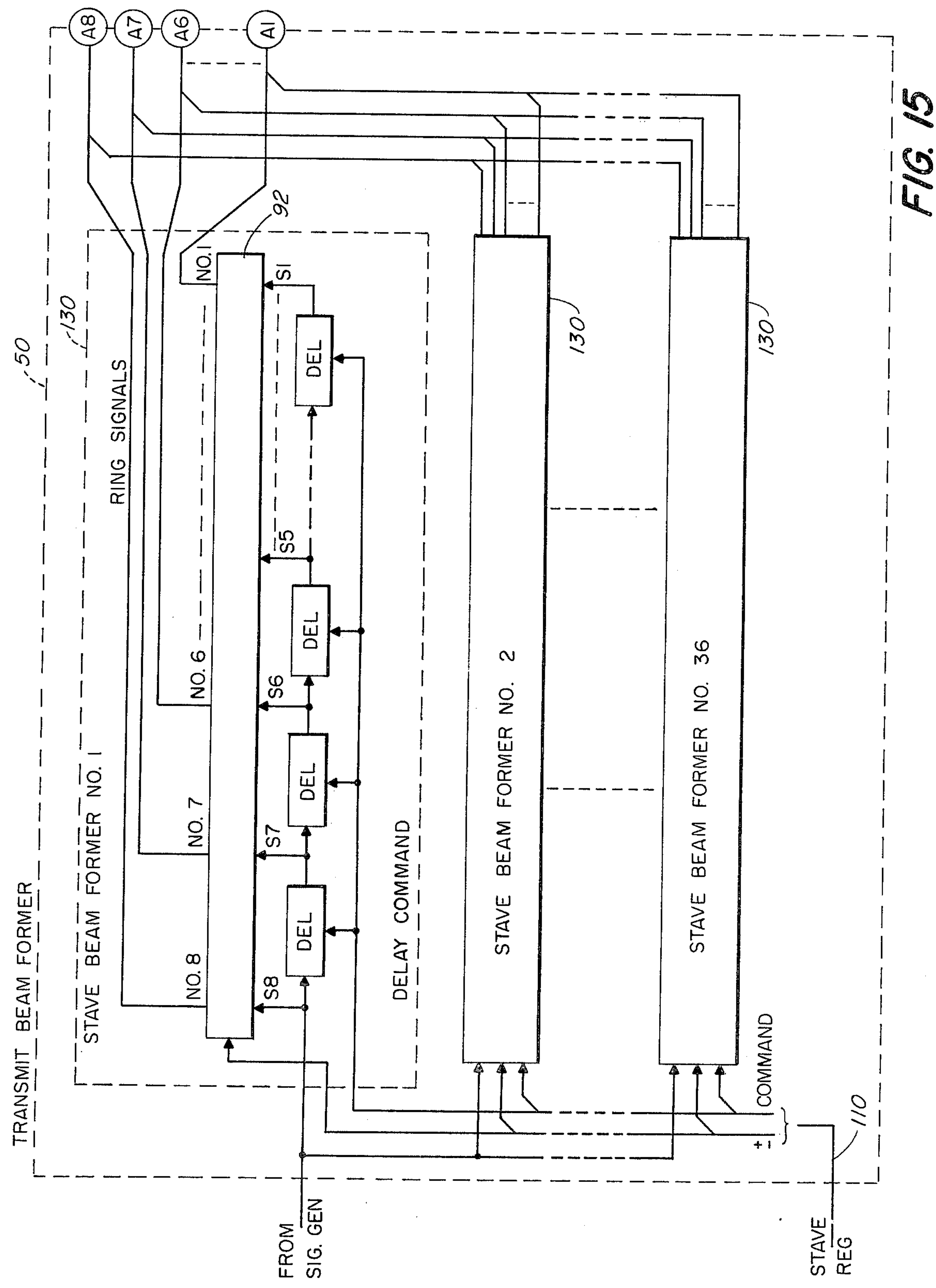
FIG. 15 is a block diagram of a transmitting beam former of the system of FIG. 6.

Referring now to FIG. 15, there is seen a block diagram of the transmitting beam former 50, previously seen in FIG. 6, which includes 36 stave beam formers 130, each of which comprises delay units 78 and a tilt switch 92 which operate in a manner previously described with reference to the stave combiner 46 of FIG. 11. In the preferred embodiment of the invention, upon transmission of sonic energy from the array 24 of FIG. 2, the sonic energy is transmitted simultaneously from all of the 288 transducer elements 38. The direction of the transmitted radiation is controlled in the vertical plane on a stave by stave basis with each stave having the necessary interelement delays to impart positive or negative values of tilt (or elevation) to compensate for rolling and pitching of the ship 20 of FIG. 1. As seen in FIG. 12, the delay commands and the ± sign bit of the buffer storage 98 are coupled to the stave register 108 in response to a strobe signal from the timer 106. The stave register 108 accepts only the stave delay portion of the delay commands of the memory 96 of FIG. 14, the commands relating to DEL I–VI being discarded since they are not utilized for transmission of sonic energy from the array 24 of FIG. 2. The stave delay commands are coupled from the register 108 of the controller 58 along line 110, seen also in FIG. 6, to the beam former 50 of FIG. 15. The signal to be transmitted is provided by the signal generator 52 and coupled therefrom to the beam former 50.

The beam formers 50 are coupled to the diplexer 60 of FIG. 6 in the following manner. Each stave beam former 130 has eight outputs corresponding to the eight transducer elements 38 in a stave of the array 24 of FIG. 2. Terminals A1–A8 of the beam former 50 correspond to these eight outputs. For simplicity in drawing the figure, the eight outputs of each of the 36 stave beam formers 130 are shown fanning in to cables coupled to each of the eight terminals A1–A8. In FIG. 6, these cables are seen to fan out to each of the eight ring circuits 44, and then within a ring, are again seen to fan out to each of the diplexers 60 for coupling the transmit signal to the corresponding transducer elements 38.

With reference to FIGS. 4 and 15, it is seen that a wave front of sonic energy propagating away from the array 24 in the opposite sense of the vector V*n* will radiate first from a transducer element 38 at the bottom of a stave with the radiations from successive elements of the stave being delayed until the top element of the stave from which the wave front radiates last. Accordingly, it is seen that the transducer element 38 of the first ring is delayed the most with the elements of the successive rings being delayed with successively smaller values until the eighth ring of which the radiated signal is not delayed. As seen in FIG. 15, the signal exiting from port number 1 of the switch 92 has been delayed seven times by seven delay units 78, while the signal applied to terminal A6 is delayed only twice, the signal applied to terminal A7 is delayed only once and the signal applied to terminal A8 is not delayed. The tilt switch 92, when energized by a negative value of the ± sign bit switches the connections so that output port number 1 of the tilt switch 92 is connected to line S8, output port number 2 is connected to line S7, and so on, with output port number 8 being coupled to line S1. Energization of the tilt switch thus reverses the sequence of delays to the signals emanating from a stave of the array 24 so that the radiated beam is directed downwardly.

If desired, the transmission radiation pattern may be in the form of a cone in which all staves of the array 24 direct the radiation at a depression angle of 10° relative to the horizontal. Such a pattern is useful when it is desired to obtain reflections from the ocean bottom. With reference to the array 24A of FIG. 5, it is noted that the foregoing teachings of the invention are applicable also to this array. Slight modifications to the disclosed circuits are required. For example, with reference to FIG. 6, in view of the fact that the eighth ring has fewer transducer elements than the first ring, some of the diplexers 60 would not be connected to any transducer element 38. Also, the values of the delay commands stored in the memory 96 of FIG. 14 would be altered slightly to compensate for the curvature of the surface of the array 24A; the various points of the curved surface of the array 24A would intercept a wave front of sonic energy at times somewhat different than that which occurs when the array is perfectly cylindrical.

Again referring to FIG. 6, it is seen that the system 42 provides for the transmission and reception of radiant energy in a space stabilized radiation pattern. The coupling of a transmitted signal reference, provided by the signal generator 52, to the receiver 48 permits the use of correlation techniques for the reception of echo ranging signals. In addition, the synchronization of the receiver with the transmitting and beam forming portions of the system 42 permit the gating of signals to permit the examination of such signals as may occur within predesignated ranges of distance, azimuth and elevation. The coupling of the display console 24 by the mode signal to the clock 54 and the controller 58 readily permits sector scanning and the passive listening to underwater targets. The synchronization of the display 28 with the clock 54 permits the displaying of data on the display in synchronism with the spatial distribution of the data in the ocean around the ship 20 of FIG. 1. This signal processing is accomplished after the successive samples from the azimuthally scanned receiving beam are grouped together according to the successive bearing designations of the beam as shown with reference to the receiver 48 of FIG. 6.

Returning again to FIG. 6, the receiver 48 is seen to comprise a multisection storage unit 132 coupled to the receiver input for storing signals from terminal J. There are 36 individual sections to the storage unit 132 which are addressed by the bearing signal coupled to terminal E of the receiver 48 from the controller 58. Thus, the successively received samples of data at specific orientations of the scanned receiving beam are stored sequentially in individual sections corresponding to the respective bearings of the receiving beam. The data thus stored in the storage unit 132 is now available for the aforementioned data processing.

It is understood that the above-described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. A beam steering system comprising:

an array of radiating elements positioned in subarrays located in planes transverse to a common axis, each of said subarrays having a similar geometric shape with symmetry about said axis and being spaced apart along said axis;

means coupled to said radiating elements for providing samples of signals thereof at a predetermined rate;

a set of delay units, individual ones of said delay units being coupled via said sampling means to corresponding ones of said radiating elements for delaying signals propagating through said radiating elements to form a beam of radiation having a predetermined direction, each of said delay units including means for storing a sequence of said samples;

means coupled to said delay units for extracting samples of said sequences in accordance with delay command signals, each delay command signal being the sum of a ring command and a stave command representing respectively the magnitudes of geometric projections in transverse and axial planes of said array of a center line of a beam of radiation oriented to said array by predetermined angles of tilt and bearing; and wherein said extracting means includes means for altering individual ones of said delay command signals at a rate higher than said sampling rate to provide a plurality of beams of radiation during the duration of one of said samples.

2. A system according to claim 1 for selecting respectively one of said sets of ring commands and one of said stave commands corresponding to a predetermined angle of tilt.

3. A system according to claim 1 wherein said altering means comprises bearing designation means for commuting values of signal delay about said axis for signals of said radiating elements corresponding to a predetermined value of bearing.

4. A system according to claim 1 wherein said extracting means includes means for summing multiples of said stave commands with one of said bearing commands to delay signals of radiating elements of one of said subarrays relative to signals of radiating elements of a second of said subarrays.

5. In combination:

a plurality of radiating elements arranged in an array having symmetry about a central axis for providing beams of radiation oriented relative to said array by angles of tilt and bearing;

a plurality of storage units coupled to said plurality of radiating elements for providing a set of delays to signals coupled to said radiating elements for providing a beam of radiation having a predetermined angle of tilt, said storage units being addressable for providing other sets of signal delays corresponding to other angles of tilt; and means coupled to said storage units for permuting a sequence of addresses to said storage units for altering the orientation of a beam of radiation at a rate higher than the bandwidth of said signals.

6. A combination according to claim 5 further comprising means coupled to said storage units for selecting one of said sets of delay values corresponding to a selected angle of tilt.

7. A radiating system comprising:

a plurality of radiating elements positioned in staves arranged circumferentially around an axis;

means responsive to the orientation of said axis relative to a reference frame for computing values of interelement delays for the generation of a beam of radiation having a predetermined orientation;

means for storing values of said interelement delays, said storing means providing a set of said interelement delay values in accordance with an instruction signal coupled thereto from said computing means;

means coupled to said storing means for continuously presenting a sequence of said set of delay values at a rate faster than a computation rate of said computing means; and means coupled to said presenting means for adjusting delays between signals coupled to said radiating elements to form a beam of radiant energy.

8. A system according to claim 7 wherein said delay adjusting means includes means for delaying signals between such ones of said radiating elements positioned within a ring about said axis and for combining said delayed signals of said ring.

9. A system according to claim 8 wherein said adjusting means further comprises means for imparting delays between signals coupled to radiating elements of one of said staves and for combining said delayed signals to direct a beam of radiation through an angle lying in a plane containing said axis.

10. A system according to claim 7 further comprising means coupled to said radiating elements for sampling signals coupled thereto.

11. A system according to claim 10 further comprising means synchronized to said sequence presenting means for storing samples of said sampling means.

12. A system according to claim 11 wherein said sample storing means has storage bins for storing said samples, each of said bins corresponding to one of said sets of said sequence of sets of delay values of said sequence presenting means.

13. A radiating system comprising:

a plurality of radiating elements positioned in staves arranged circumferentially around an axis of a reference frame;

means coupled to said radiating elements for providing samples of signals thereof at a predetermined rate;

a set of delay units, individual ones of said delay units being coupled via said sampling means to corresponding ones of said radiating elements for delaying signals propagating through said radiating elements to form a beam of radiation having a predetermined direction, each of said delay units including means for storing a sequence of said samples;

means coupled to said delay units for extracting samples of said sequences in accordance with delay command signals, said extracting means including a memory for storing a plurality of said delay command signals;

a computer responsive to the orientation of said reference frame for computing the angular orientation of a beam of radiation relative to said reference frame, said computer addressing said memory to couple individual ones of said delay command signals to said delay units; and wherein said extracting means includes means for altering individual ones of said delay command signals at a rate higher than said sampling rate to provide a plurality of beams of radiation during the duration of one of said samples.

14. A system according to claim 13 wherein said computer computes the bearing of said beam of radiation, said delay units are shift registers having multiple taps, and said memory is a read-only memory.

15. A system according to claim 13 wherein said extracting means comprises switching means coupled between said memory and said delay units for sequentially applying said delay command signals to sequential ones of said delay units.

16. A system according to claim 15 wherein said extracting means comprises means coupled to said delay units for summing together signals delayed by said delay units, and wherein said switching means periodically switches said delays at a rate higher than the bandwidth of said signals propagating through said radiating elements.

* * * * *

UNITED STATES PATENT OFFICE
CERTIFICATE OF CORRECTION

Patent No. 4,001,763 Dated January 4, 1977

Inventor(s) Arent H. Kits van Heyningen

It is certified that error appears in the above-identified patent and that said Letters Patent are hereby corrected as shown below:

Column 7, line 38, change "36" in bold face type to regular type

Column 10, line 23, change "dalay" to --delay--;

Column 15, line 22, change "288" in bold face type to regular type

Column 17, line 38, insert after Claim 1 -- wherein said altering means comprises tilt designation means--.

Signed and Sealed this

Third Day of May 1977

[SEAL]

*Attest:*

RUTH C. MASON
*Attesting Officer*

C. MARSHALL DANN
*Commissioner of Patents and Trademarks*